Oct. 9, 1962   J. P. BERND   3,057,509
PRESSURE VESSEL BLADDER
Filed Feb. 11, 1960
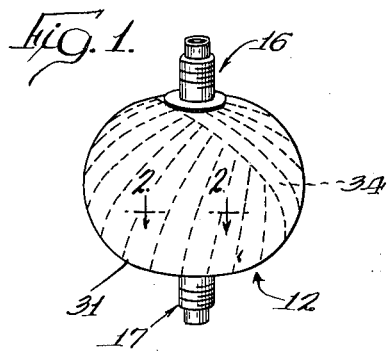
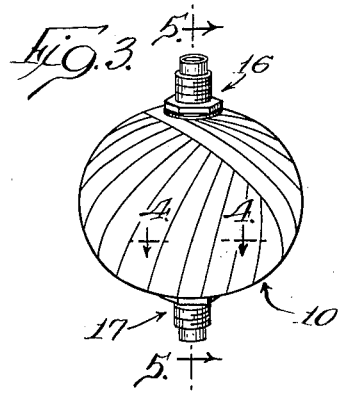
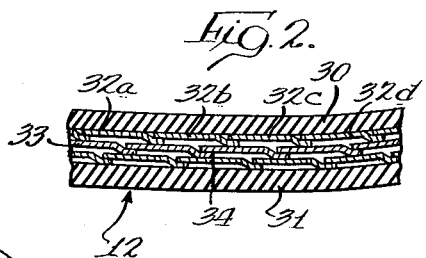
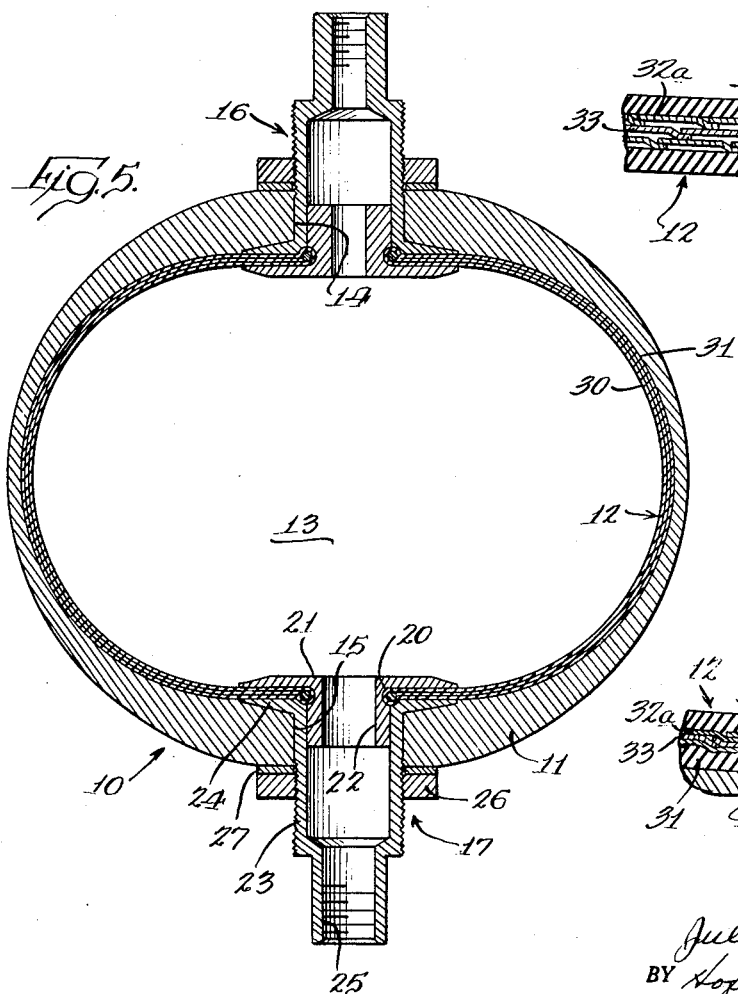
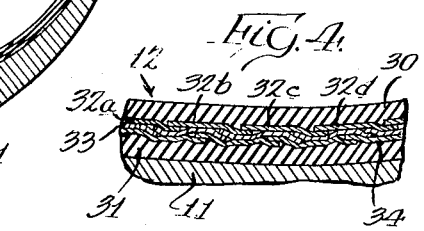
INVENTOR.
Jules P. Bernd
BY Hofgren, Brady,
Wegner, Allen & Stellman
Attys.

United States Patent Office 3,057,509
Patented Oct. 9, 1962

3,057,509
PRESSURE VESSEL BLADDER
Jules P. Bernd, Muskegon, Mich., assignor to Brunswick Corporation, a corporation of Delaware
Filed Feb. 11, 1960, Ser. No. 8,138
2 Claims. (Cl. 220—63)

This invention relates to a pressure vessel bladder and more particularly to such a bladder enabling leakproof storage of fluids in the vessel without substantial leakage of the fluid through the wall of the vessel.

An object of this invention is to provide a new and improved pressure vessel bladder.

Another object of the invention is to provide a pressure vessel bladder having a multi-layer construction with first and second layers in spaced relation and each composed of a sheet of material having the configuration of the bladder, and an intermediate layer formed by convolutions of a tape of material substantially impervious to the fluid to be stored within the vessel, the tape material substantially enclosing said first layer and with the edges of adjacent tape convolutions in overlapped relation whereby fluid pressure exerted within the vessel against the first layer maintains an effective seal between the overlapped portions of said tape convolutions to maintain a leakproof intermediate layer.

Further objects and advantages will become apparent from the following detailed description taken in connection with the accompanying drawings in which:

FIG. 1 is a perspective elevational view of the pressure vessel bladder and fittings associated therewith;

FIG. 2 is a fragmentary plan section on an enlarged scale taken generally along the line 2—2 in FIG. 1 and showing the bladder wall construction;

FIG. 3 is a perspective elevational view of an entire pressure vessel;

FIG. 4 is a fragmentary plan section on an enlarged scale taken generally along the line 4—4 in FIG. 3 and showing the construction of the entire vessel wall; and FIG. 5 is a vertical section on an enlarged scale taken generally along the line 5—5 in FIG. 3.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As disclosed herein a pressure vessel, indicated generally at 10, is composed of a wall 11 having a bladder, indicated generally at 12, disposed therein with the wall shaped to provide an interior chamber 13 having the desired shape for storing a fluid under pressure. The vessel wall 11 has a pair of openings 14 and 15 through which extend fittings 16 and 17, respectively, to connect the interior chamber 13 with suitable lines whereby a fluid may pass to and from the vessel and may be stored in the vessel at a relatively high pressure.

The vessel wall 11 is composed of a plurality of layers of continuous filament material which are laid up in a manner which may be defined as a polar wind operation and which is more particularly described in the copending application of Edward T. Strickland and Homer C. Amos, Serial No. 848,979, filed October 27, 1959 and now abandoned, with the subject matter now disclosed in a continuing application, Serial No. 67,943, filed November 8, 1960.

Each of the fittings 16 and 17 need not be, but are shown as, identical and comprise a base part 20 having a flat interior side 21 and a central passage 22. The fitting main section comprises a sleeve 23 which is externally threaded and which press fits onto the base 20 and has a radial flange 24 to coact with the base 20 and tightly hold the bladder 12 to the fitting. The fitting sleeve 23 at its outer end is internally threaded, as indicated at 25, for attachment to a fluid line or the like. A final part of the fitting is the nut 26 which is threaded on the external threads of the sleeve 23 and which is spaced from the vessel wall by a washer 27.

The bladder 12 as shown more particularly in FIGS. 2 and 4 embodies a multi-layer construction with an inner layer being formed as a sheet 30 of butyl rubber which defines an interior surface of the bladder. A second layer 31 spaced from the inner layer 30 is also composed of butyl rubber and defines the bladder exterior. The space between the layers 30 and 31 has an intermediate layer formed of material substantially impervious to the fluid to be stored in the chamber 13 of the vessel. This material is in the form of a tape with tape convolutions in the first layer being indicated at 32a, 32b, 32c and 32d. The intermediate bladder layer, as shown, includes additional thicknesses of the tape with tape convolutions 33 and tape convolutions 34 placed upon the layer 32a–d. In both figures, the tape has been shown exaggerated in thickness to more fully illustrate the construction. In actual practice, the tape convolutions will lie more flat than shown. In FIG. 2, the bladder is shown before curing and after curing in FIG. 4.

In making the bladder, a mandrel is first formed of material such as salt and the first layer 30 is laid up on the bladder as a sheet of material, such as uncured butyl. A layer of tape 32 is then placed upon the sheet 30 in a polar wind manner with a series of tape convolutions to enclose the inner layer 30 of the bladder. This is accomplished by laying up one convolution after the other with each convolution passing about the poles of the mandrel. Thus the convolutions gradually converge as they approach the poles. This layup is the same as that described for the filaments in the application referred to above.

The tape material is chosen to be substantially impervious to the material or fluid that is to be stored within the vessel and in one instance with the vessel adapted to store helium under a relatively high pressure the tape is polyethylene terephthalate. A commercial form of this material is known as Mylar and is manufactured by E. I. du Pont de Nemours and Co. This tape has a width of approximately one inch and has a thickness whereby laying up of three layers of the tape results in a thickness of approximately .010 inch at the central part or equator of the vessel wall. This tape may have a suitable adhesive on the inner side thereof such as a polyester adhesive with one example being the Mylar adhesive No. 4697 of E. I. du Pont de Nemours and Co.

As will be noted in FIGS. 2 and 4, the adjacent tape convolutions have their edges in overlapping relation and the convolutions completely enclose the inner layer 30 of the bladder. A final sheet of uncured butyl is then placed upon the tape convolutions and the bladder is then wrapped with suitable material placed under tension to exert compressive forces thereon and the bladder placed in a rubber bag. A vacuum is then drawn within the bag and the bladder subjected to a curing operation of approximately 1½ hours at 330° F. This results in curing the butyl rubber and some fusing of the tape but the tape still retains its distinct tape configuration. After completion of the bladder, the vessel is then made in the manner disclosed in the copending application referred to above. The completed vessel is shown in FIGS. 3 and 5 of the drawings.

When the pressure vessel is in use and storing a gas such as helium at high pressure, the fluid pressure is exerted outwardly against the inner layer 30 of the bladder and this pressure results in tightly compressing the overlapped edges of the tape convolutions together to effect a mechanical seal between the still distinct tape convolutions whereby leakage through the wall of the bladder is substantially prevented.

I claim:

1. A pressure vessel having the shape of a surface of revolution for storing fluid under high pressure comprising in combination, a rigid vessel wall having opposite poles, a fitting extending through said wall at one of said poles, a bladder engaging and forming a liner for the inner surface of the vessel wall to prevent leakage through the wall, said bladder including a first layer of sheet material defining an enclosed interior wall, an outer layer of sheet material defining an external bladder wall, and an intermediate layer between said first and outer layers completely covering said first layer and formed of material substantially impervious to said fluid, said impervious material being in the form of a tape wound on the first layer with each tape convolution extending generally along paths between the poles and adjacent the fitting, and adjacent convolutions being overlapped at the midpoint between the poles and gradually converging toward the poles to increase the overlap whereby pressure exerted within the vessel against the first layer causes tight engagement between the overlapped tape convolutions, said fitting engaging said first layer and holding the bladder relative to the vessel wall.

2. A pressure vessel as defined in claim 1 in which said impervious tape material is made of polyethylene terephthalate.

References Cited in the file of this patent

UNITED STATES PATENTS

| | | |
|---|---|---|
| 2,157,580 | Voit et al. | May 9, 1939 |
| 2,519,069 | Roberts | Aug. 15, 1950 |
| 2,688,488 | Crowley | Sept. 7, 1954 |
| 2,888,042 | St. John et al. | May 26, 1959 |
| 2,945,693 | Way | July 19, 1960 |